United States Patent
Luke

(10) Patent No.: US 7,441,781 B2
(45) Date of Patent: Oct. 28, 2008

(54) LIFT SYSTEM FOR RAISING THE REAR OF A TRUCK

(76) Inventor: Waylon Glenn Luke, 224 S. East Rd., Nashville, GA (US) 31639

(*) Notice: Subject to any disclaimer, the term of this patent is extended or adjusted under 35 U.S.C. 154(b) by 168 days.

(21) Appl. No.: 10/964,020

(22) Filed: Oct. 14, 2004

(65) Prior Publication Data
US 2006/0082078 A1   Apr. 20, 2006

(51) Int. Cl.
*G60G 17/00* (2006.01)
*G60G 17/052* (2006.01)
*B60P 1/00* (2006.01)
*B60S 9/00* (2006.01)
*B60S 9/02* (2006.01)

(52) U.S. Cl. .................. 280/6.151; 280/124.16; 254/423

(58) Field of Classification Search .......... 280/6.15, 280/6.151, 6.152, 6.153, 6.155, 6.157, 124.16, 280/763.1, 764.1
See application file for complete search history.

(56) References Cited

U.S. PATENT DOCUMENTS

| | | | |
|---|---|---|---|
| 3,211,313 A * | 10/1965 | Katz | 414/498 |
| 3,749,363 A | 7/1973 | Hauser | |
| 3,781,035 A * | 12/1973 | Petersson et al. | 280/764.1 |
| 3,884,502 A * | 5/1975 | Wagner | 280/423.1 |
| 4,558,886 A * | 12/1985 | Straub | 280/6.151 |
| 4,645,181 A | 2/1987 | Schapansky | |
| 4,993,688 A | 2/1991 | Mueller et al. | |
| 5,193,849 A * | 3/1993 | Holzmann | 280/6.152 |
| 5,465,940 A | 11/1995 | Guzman et al. | |
| 5,632,471 A | 5/1997 | Pradel | |
| 5,765,810 A | 6/1998 | Mattera | |

* cited by examiner

*Primary Examiner*—Paul N. Dickson
*Assistant Examiner*—Joselynn Y. Sliteris
(74) *Attorney, Agent, or Firm*—Theresa M. Seal

(57) ABSTRACT

A lift system for integration with the air suspension system of a truck for raising the rear of the truck so that the trailer can be attached and the landing gear let up includes an air dump valve, two air control switch valves, one one-way valve, one air gauge rated to 100 psi., one air regulator, an on/off control switch, a safety alarm buzzer, and the appropriate number and size of fittings and airlines. The on/off control switch is located within the cab of the truck and allows the operator to manually engage or disengage the lift system. The lift system is interconnected to and powered by the truck's main battery and main air supply whereupon engagement of the lift system facilitates the alignment and connection of the rear of the truck to the trailer and removes the weight from the truck's landing gear by raising the landing gear so that the landing gear can be let up.

3 Claims, 4 Drawing Sheets

"OFF" POSITION

LIFT SYSTEM FOR RAISING THE REAR OF A TRUCK

FIELD OF THE INVENTION

The present invention pertains to pneumatic jacks and lifting systems for automotive vehicles, and more particularly pertains to a pneumatic lift system integrated with the air suspension system of a truck for raising and lowering the rear of truck to facilitate the connection of the truck to the trailer.

BACKGROUND OF THE INVENTION

Air suspension systems have steadily increased in popularity in all segments of the trucking industry because of their numerous benefits. A properly designed system reduces the shock and vibration transmitted to the truck and trailer from the wheels and road, thereby reducing maintenance costs by reducing the wear and tear on the equipment. The use of an air suspension system that can include one or more air springs and air bags provides an integrated shock and suspension system that automatically changes to match the load being supported by the suspension system.

One problem encountered by all truckers occurs in the clearing and raising of the landing gear prior to the attachment or detachment of the trailer to or from the truck. It is a common occurrence for the trucker to pull into the lot to attach a cargo-carrying trailer to the truck. The trucker will first back the rear end of the truck beneath the hook-up pin located on the underside of the front end of the trailer and then connect the air lines and the electrical cables to the trailer. Then the trucker will go to lift up the landing gear or landing stands only to discover that the previous driver had positioned the trailer higher than the rear of the truck the trucker is driving. The trucker must then unhook the air lines and electrical cables and pull the rear of the truck out from beneath the front end of the trailer so that blocks, boards or 4×4s can be placed on the ground for raising the rear end of the truck to the correct height for clearing the landing gear so that the trailer can be attached to the truck and the landing gear can be raised up. However, seldom is the first attempt successful, and it usually requires a number of attempts of the trucker backing onto the blocks, getting out of the cab and checking the alignment and positioning of the rear of the truck relative to the trailer, getting back in the cab and pulling forward, then getting out of the cab so that more blocks can be added or removed, before the rear of the truck is raised to the appropriate height for clearing and raising the landing gear and making the successful connection to the trailer. This is an arduous, time-consuming, exasperating task that often leaves the trucker in a foul mood prior to a long trip.

The prior art reveals a number of lifting and jack systems for raising and lowering vehicles, with a primary emphasis on automotive vehicles.

For example, the Hauser patent (U.S. Pat. No. 3,749,363) discloses a system of jacks for raising containerized cargoes supported on transportation trucks wherein one jack is mounted to each corner of the container and the jacks can be simultaneously or independently operated.

The Schapansky patent (U.S. Pat. No. 4,645,181) discloses a high performance air jack that includes a load engaging bracket mounted to the cylinder of the air jack, and air tools can be attached to and operated from the air jack.

The Mueller et al. patent (U.S. Pat. No. 4,993,688) discloses a pneumatic jack system for an automobile wherein pneumatic jacks are mounted to the front and rear suspensions both of which are operated from the same air reservoir tank.

The Guzman et al. patent (U.S. Pat. No. 5,465,940) discloses a pneumatic jack system that includes a pneumatic jack mounted to the suspension of an automobile and controlled by a control switch located in the vehicle interior.

The Pradel patent (U.S. Pat. No. 5,632,471) discloses an air suspension system for an automotive vehicle that includes at least four air springs connected to a reservoir with at least one of the air springs located within a cavity formed on the vehicle body.

The Mattera patent (U.S. Pat. No. 5,765,810) discloses a vehicle jacking system that includes a pair of air jacks mounted to both the front and rear axles operated by an air compressor and an electrical control panel within the vehicle.

Nonetheless, despite the ingenuity of the above devices, there remains a need for a lift system that can be integrated with and retrofitted to the existing air suspension system of a vehicle, with an emphasis on being integrated with tractor-trailers, for raising the rear of the truck to the height of the trailer to clear the landing gear and connect the truck to the cargo-carrying trailer.

SUMMARY OF THE INVENTION

The present invention comprehends a lift system for integration with the air suspension system of a truck and which is powered by the truck's battery and main air supply. The lift system includes an air dump valve, a pair of air control valves, one one-way valve, one air gauge rated to 100 psi., one air regulator, an on/off switch and associated safety alarm buzzer, and appropriately sized air lines and fittings. The lift system allows the truck driver to manually adjust the height of the rear of the truck to match the height of the trailer so that the landing gear on the trailer can be cleared from the ground for connecting the truck to the trailer.

It is an objective of the present invention to provide a lift system for integration with the air suspension system of the truck that facilitates the task of attaching the cargo-carrying trailer to the truck.

It is another objective of the present invention to provide a lift system for integration with the air suspension system of the truck that is wholly a self-sufficient system operable without the need to rely upon an external energy source or an external air supply.

It is still another objective of the present invention to provide a lift system for integration with the air suspension system of the truck that allows the operator to let up the truck's landing gear without the stress and strain of the weight of the trailer bearing down upon the landing gear stands.

It is a still further objective of the present invention to provide a lift system that is a timesaving accessory for any truck employing an air suspension system.

It is yet another objective of the present invention to provide a lift system for integration with the air suspension system of the truck that eliminates the costly towing bills that can occur when low-riding tractor trailers are caught on speed bumps and curves.

It is still yet another objective of the present invention to provide a lift system for integration with the air suspension system of the truck that eliminates the need for stacking blocks, boards, or other shims beneath the rear wheels of the truck and making multiple vehicular maneuvers with the truck in order to obtain the correct height for connecting the trailer to the truck.

Yet another objective of the present invention is to provide a lift system for integration with the air suspension system of the truck that gives the operator an ergonomic means to mate a trailer with the truck that eliminates the back strain and fatigue that result from the repeated bending over, stacking, aligning and unstacking blocks or boards in order provide clearance for raising the landing gear.

Yet still another objective of the present invention is to provide a lift system for integration with the air suspension system of the truck that provides a less-cluttered environment in and about the cab of the truck and the truck yard or lot by eliminating the need to store blocks, boards, 4×4s and other types of shims.

Yet a still further objective of the present invention is to provide a lift system for integration with the air suspension system of the truck that reduces the time and physical and mental aggravation endured when using the commonly known techniques for matching the height of the truck to the height of the trailer and for clearing and raising the landing gear.

Another objective of the present invention is to provide a lift system for integration with the air suspension system that overrides the air suspension of the truck when engaged for raising the rear of the truck but does not interfere with the truck's air suspension system when not so engaged.

A further objective of the present invention is to provide a lift system for integration with the air suspension system of the truck that facilitates the alignment and connection of the truck to trailers irrespective of the heights to which the trailers have been dropped.

A yet further objective of the present invention is to provide a lift system for integration with the air suspension system of the truck wherein the components of the lift system can be easily stored within the cab of the truck when the lift system is not being used.

A yet still further objective of the present invention is to provide a lift system for integration with the air suspension system of a commercial bus for raising the front of the bus to facilitate repairs on the bus.

These and other objects, features, and advantages will become apparent to one skilled in the art upon a perusal of the following detailed description of the preferred embodiment and the accompanying drawing figures.

DETAILED DESCRIPTION OF THE PREFERRED EMBODIMENT

Illustrated in FIGS. 1-5 is a preferred embodiment for a lift system 10 that is integrated with the air suspension system of a vehicle, preferably a truck, for raising and lowering the rear of the truck so that the truck can be properly aligned with and connected to the trailer, and also for reducing the weight on the trailer's landing gear so that the operator can let up the landing gear. The lift system 10 is a closed system that is fully integrated into the air suspension system of the vehicle and is powered from the vehicle's battery. Standard air hose lines interconnect all the pneumatic components of the lift system. In addition, all the components are standard, off-the-shelf items such as pneumatic switches and flow control valves.

Figure 3:
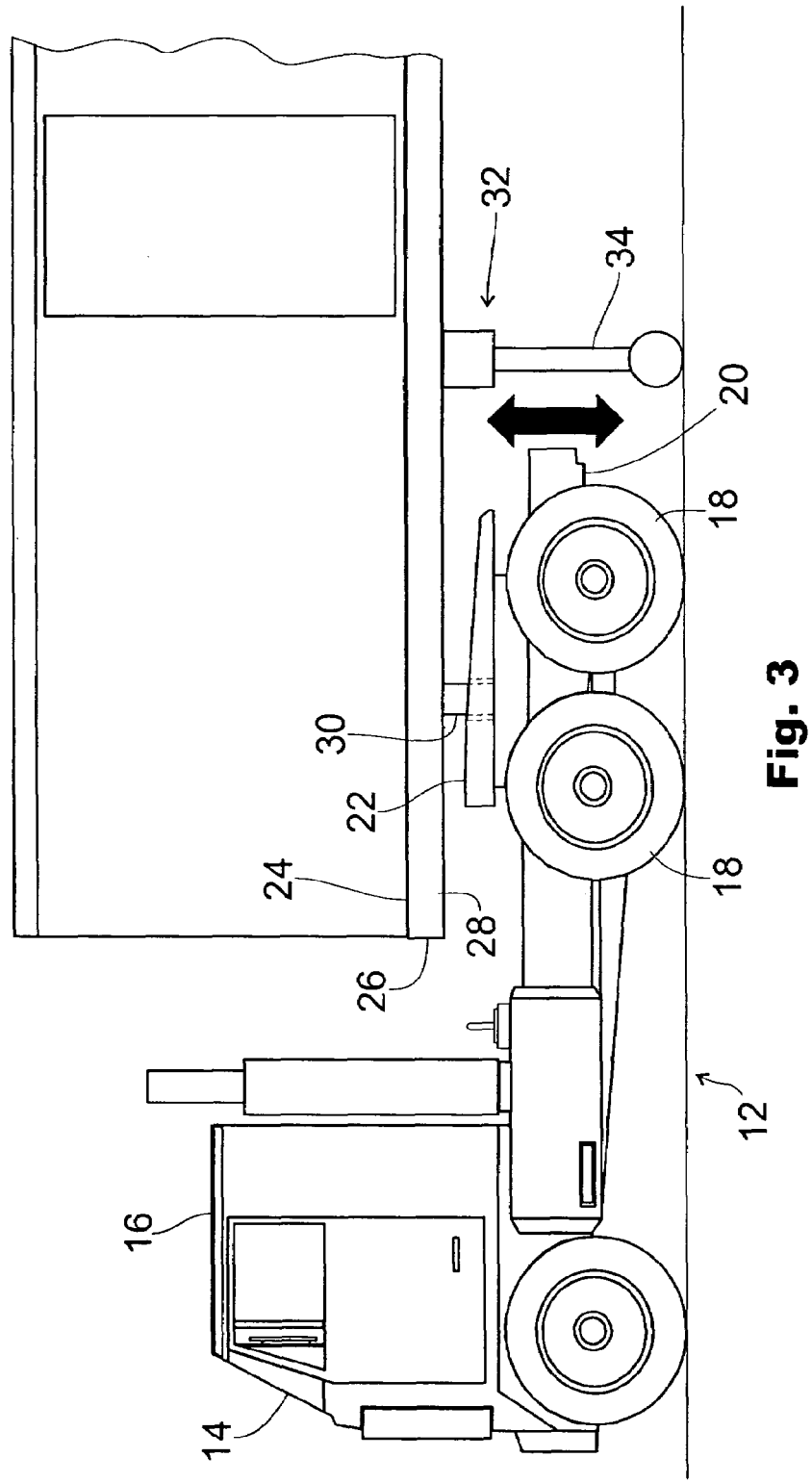
FIG. 3 is a side elevational view of a representative tractor-trailer illustrating the disposition of the landing gear when supporting the trailer and the schematic raising and lowering of the rear of the truck for letting up the landing gear.

Thus, shown in FIG. 3 is a representative tractor-trailer 12 that includes a truck 14 having a cabin 16, two sets of rear wheels 18, a rear or back end 20 and a hitch 22 mounted on the rear end 20. The cargo-carrying trailer 24 includes a front end 26 and an underside 28 from which a locking or hitch pin 30 projects and that mates with the hitch 22 for connecting the trailer 24 to the truck 14. When unattached or disconnected from the truck 14, the trailer 24 is free standing and supported by landing gear 32 mounted to the underside 28 of the trailer 24 adjacent the front end 26 thereof. The landing gear 32 includes landing stands 34 (only one of which is shown) that can be raised or let up by a pivoting or swinging action for properly connecting the trailer 24 to the truck 14.

Figure 1:
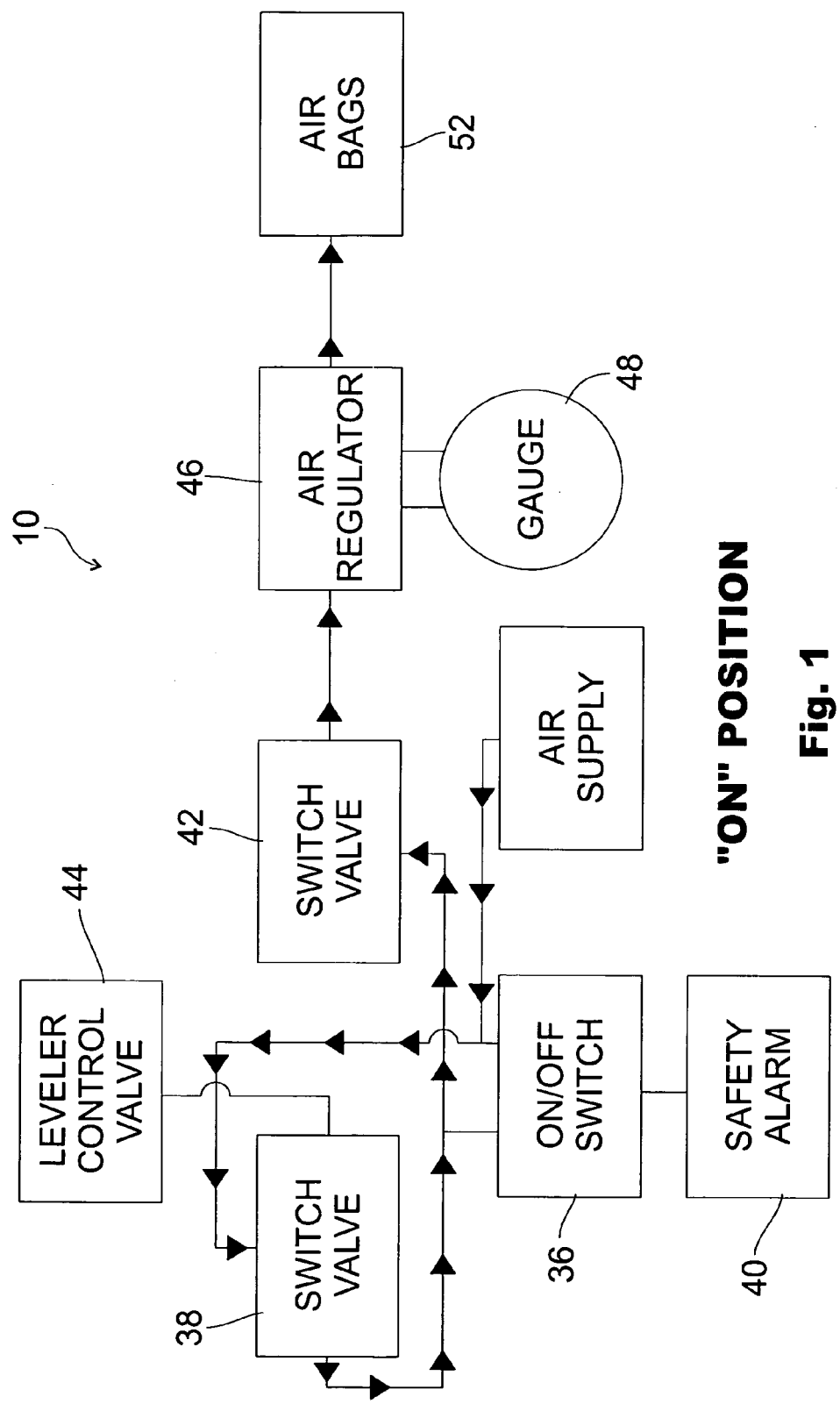
FIG. 1 is a schematic flowchart of the lift system of the present invention illustrating the direction of airflow through the system when the system is disposed to the on position for raising the rear of the truck.
Figure 4:
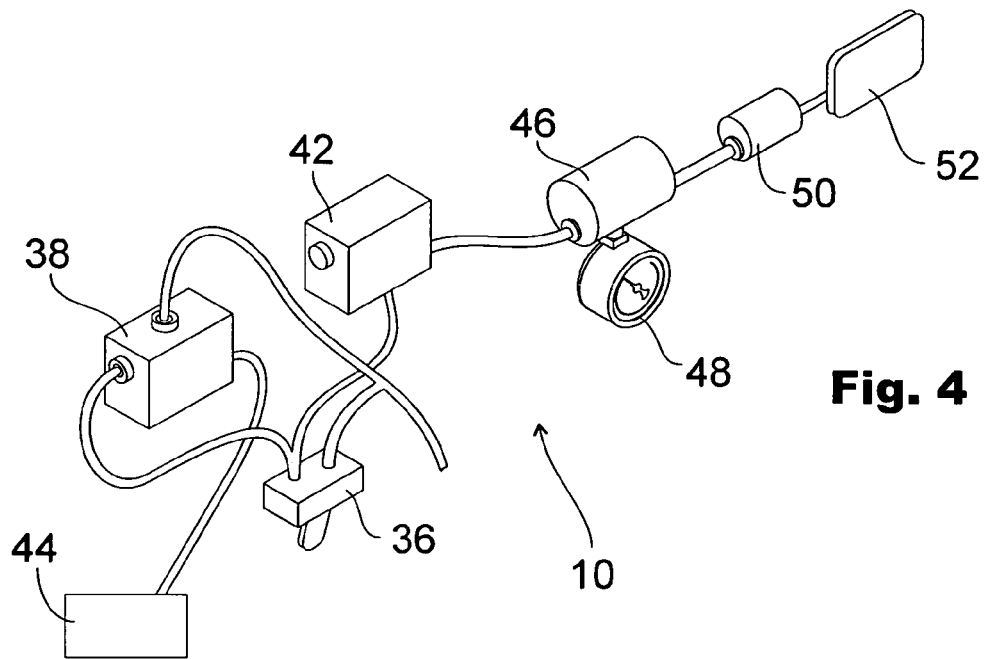
FIG. 4 is a perspective view of the lift system of the present invention illustrating the primary components of the system and the direction of airflow when the system is engaged for raising the rear of the truck.

As shown in FIGS. 1, 2, 4, and 5, the lift system 10 of the present invention includes a manually operable on/off control switch 36 preferably placed in the cab 16 within easy reach of the truck operator and is interconnected to the truck's 14 air suspension system and air supply, and a first air control valve 38. A safety alarm buzzer 40 is electrically interconnected with the control switch 36 to alert the operator if the lift system 10 is still engaged when the truck 14 is in motion. The drive train of the truck 14 can be misaligned if the lift system 10 is inadvertently left on while the truck 14 is in motion. As shown in FIGS. 1 and 4, when the control switch 36 is disposed to the "on" position, the first air control valve 38 is in series with a second air control valve 42, and the first air control valve 38 prevents airflow to the truck's air ride leveler control valve 44. Both the first and the second air control valves 38 and 42 are in turn connected in series with an air regulator 46 having an air gauge 48 rated to 100 psi. and which are connected in series with a one-way valve 50. The one-way valve 50 allows one-way airflow from the air regulator 46 to a set of air bags 52 that are part of the truck's 14 air suspension system and which are interconnected with and controlled by the air ride leveler control valve 44.

Thus, as FIGS. 1 and 4 illustrate via the directional arrows, when the control switch 36 is disposed to the "on" position, the air ride leveler control valve 44 is bypassed or overridden by the lift system 10, and the air flows from the truck's 14 air suspension air supply in serial order through the control switch 36, then through the first control valve 38, the second control valve 42, the air regulator 46, the one-way valve 50 and finally into the air bags 52 with the air ride leveler control valve 44 now acting as a dump valve for the bypassed or overridden air suspension system.

It should be noted that the air regulator 46 includes manual controls for allowing the operator to control the airflow to the air bags 52 while monitoring the air gauge 48 that in turn cause the air bags 52 to inflate and deflate; and it this inflation and deflation that allows the operator to incrementally adjust the height of the truck's 14 rear end 20 so that the rear end 20 can be brought into alignment and mated with the trailer 24.

Although the air bags 52 are rated to 100 psi. it is advisable to put no more than 90 pounds into the air bags 52 as they may burst and cause injury if fully inflated.

Figure 2:
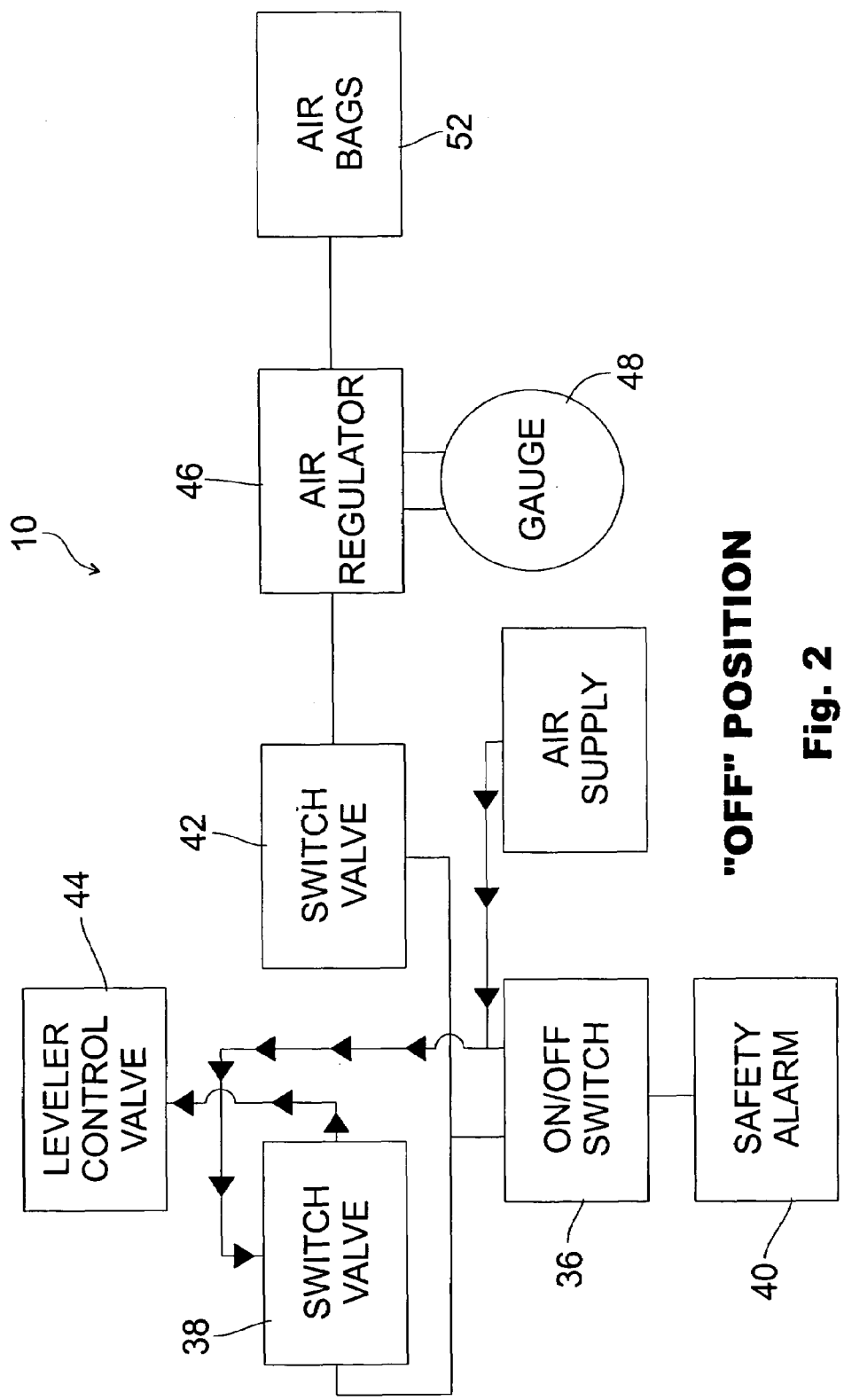
FIG. 2 is a schematic flowchart of the lift system of the present invention illustrating the direction of airflow in the system when the system is not in use thus allowing operation of the truck's suspension system.
Figure 5:
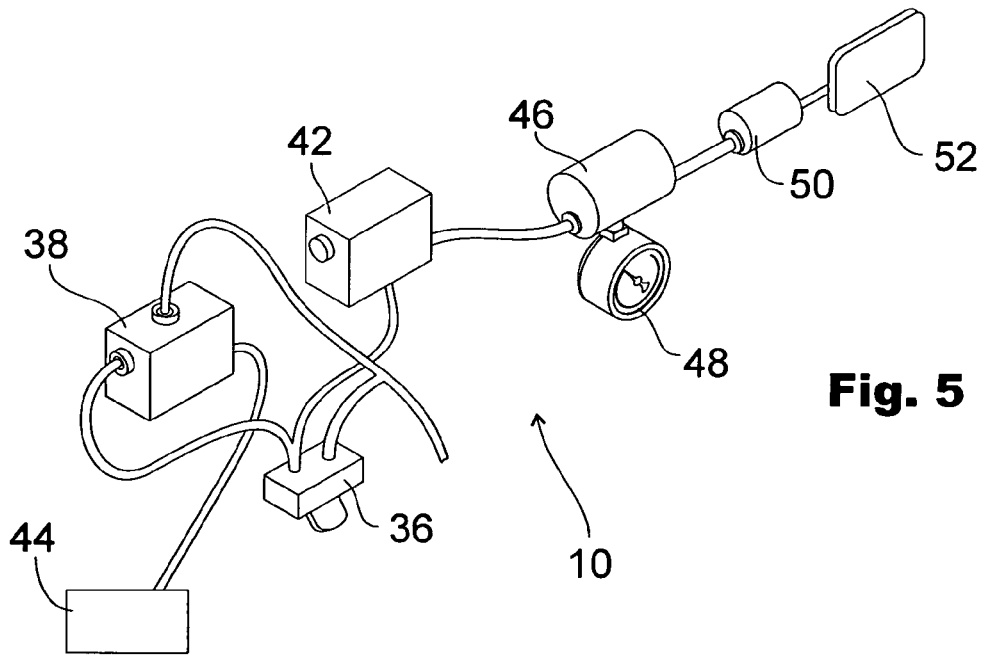
FIG. 5 is a perspective view of the lift system of the present invention illustrating the primary components of the system and the direction of airflow when the system is not engaged and the truck's air suspension system is operable.

FIGS. 2 and 5 illustrate the disposition of the lift system 10, and the airflow therethrough, when the control switch 36 is in the "off" position. With the control switch 36 in the "off" position, air flows through the first air control valve 38 which, being in a de-energized state, is in series with the air ride leveler control valve 44 of the truck's 14 air suspension system. When the lift system 10 is in the disengaged state, the other elements of the lift system 10 are bypassed as the airflow to the air bags 52 is regulated by the air ride leveler control valve 44 in accordance with the normal operating parameters of the truck's 14 air suspension system.

One method or scenario for using the lift system 10 of the present invention is as follows and begins with the operator pulling into the lot or truck yard to hook up the load-carrying trailer 24 to his or her truck 14 with the lift system 10 already integrated with and interconnected to the truck's 14 air suspension system and ready for use. After backing up the truck 14 adjacent the trailer 24 with the rear end 20 slightly ahead of the front 26 of the trailer 24, the operator will go to retract or let up the trailer's 24 landing gear 32 only to find that the previous driver has dropped or located the trailer 24 at a position higher than the rear end 20 of the truck 14 the operator is presently driving rendering it impossible to successfully connect the locking pin 30 with the hitch 22. The operator will then return to the cab 16 and manually place the control switch 36 in the "on" position thereby engaging the lift system 10. The rear 20 of the truck 14 will be raised so that the hitch 22 mates with the locking pin 30 for successfully connecting the trailer 24 to the truck 14. This action also raises the trailer 24 so that the landing stands 34 are off the ground, and the operator can then exit the cab 16 and return to let up the landing gear 32 that is now free of the stress and strain of the weight of the trailer 24 that had been bearing down on the landing stands 34 before the raising of the rear 20 of the truck 14. The operator can then return to the cab 16 and move the control switch 36 to the "off" position thereby disengaging the lift system 10 and returning the truck 14 to the original or normal riding settings. The lift system 10 of the present invention thus directs air into the air bags 52 when engaged to raise the rear 20 of the truck 14 higher than normal thereby raising the trailer 24 and clearing the landing gear 32 off the ground. Thus, the weight of the trailer 24 is taken off the landing stands 34 so that the operator can raise the landing stands 34 in a timesaving, efficient manner.

The foregoing is considered only as illustrative of the principles of the invention; since numerous modifications, alterations, and variations will readily occur to those skilled in the art, it is not desired to limit the invention to the exact construction and operation shown and described, and accordingly, all suitable modifications, variations, and alterations may be resorted to while still falling within the spirit of the invention and the scope of the appended claims.

I claim:

1. A lift system for use with a vehicle's air suspension system having an air supply, a set of air bags, a battery, air hose lines for interconnecting the lift system with the air suspension system and an air ride leveler control valve for raising the rear end of the vehicle for connecting the rear end with a trailer and letting up the trailer's landing gear, the lift system, comprising:

a control switch electrically interconnected to the battery and having an on position for engaging the air suspension system and raising the vehicle's rear end, and an off position;

an air hose line interconnected to the control switch and the air supply;

a first air control valve and a second air control valve, the first air control valve electrically interconnected to the control switch such that when the control switch is disposed to the on position, air flows from the vehicle's air supply through the first and second air control valves and to the air bags for inflating the air bags and raising the rear end of the vehicle;

a second air control valve electrically interconnected to the control switch such that when the control switch is disposed to the off position, the second air control valve is closed and air can only flow through the first air control valve to the vehicle's air ride leveler control valve;

an air regulator having an air gauge with the air regulator interposed between the second air control valve and the air bags for regulating the volumetric flow of air to the air bags; and a one-way valve serially connected between the air regulator and the air bags for allowing air to flow to the air bags when the control switch is disposed to the on position and preventing the flow of air to the air bags when the control switch is disposed to the off position.

2. The lift system of claim 1 further comprising a safety alarm buzzer electrically interconnected with the control switch for alerting an operator of the existence of a dangerous condition during the actuation and use of the lift system.

3. The lift system of claim 2 wherein the air regulator is manually operated for regulating the flow of air to the air bags.

* * * * *